United States Patent [19]

Grove

[11] 4,194,639

[45] Mar. 25, 1980

[54] TRUCK MOUNTED CRANE AND METHOD OF CONSTRUCTING SAME

[75] Inventor: John L. Grove, Greencastle, Pa.

[73] Assignee: JLG Industries, Inc., McConnellsburg, Pa.

[21] Appl. No.: 796,437

[22] Filed: May 12, 1977

[51] Int. Cl.² .............................................. B66C 23/06
[52] U.S. Cl. .................................. 212/59 R; 212/145
[58] Field of Search ...................... 212/58 R, 59 R, 55, 212/66, 144, 141, 46 B; 180/11, 12, 14, 25 A

[56] References Cited

U.S. PATENT DOCUMENTS

| | | | |
|---|---|---|---|
| 2,209,392 | 7/1940 | Edwards | 212/69 |
| 2,229,840 | 1/1941 | Edwards | 212/69 |
| 2,809,756 | 10/1957 | Bannister | 212/59 R |
| 2,818,275 | 12/1957 | Hollowell | 212/59 R |
| 2,848,252 | 8/1958 | Martin | 180/11 |
| 3,856,150 | 12/1974 | Wellman | 212/46 B |
| 3,885,677 | 5/1975 | Gorl et al. | 212/144 |
| 3,957,161 | 5/1976 | Tax | 212/59 R |
| 4,031,976 | 6/1977 | Lambert | 212/141 |

FOREIGN PATENT DOCUMENTS

| | | | |
|---|---|---|---|
| 1256380 | 12/1967 | Fed. Rep. of Germany | 212/59 R |
| 2460697 | 6/1975 | Fed. Rep. of Germany | 212/59 R |

*Primary Examiner*—Lawrence J. Oresky
*Attorney, Agent, or Firm*—Irvin A. Lavine

[57] ABSTRACT

A truck mounted crane has a front end including a cab, engine and front steering wheels, with rearwardly extending frame members. A crane is carried rearwardly of the truck cab, and has a rotatable upper works including a crane cab at the front and laterally centered, a boom support rearwardly of the crane cab, and laterally centered, and a boom pivoted on the boom support and extending forwardly over the crane cab. A rear end includes a rear frame made of tubular frame members which receive the front frame members therein.

4 Claims, 4 Drawing Figures

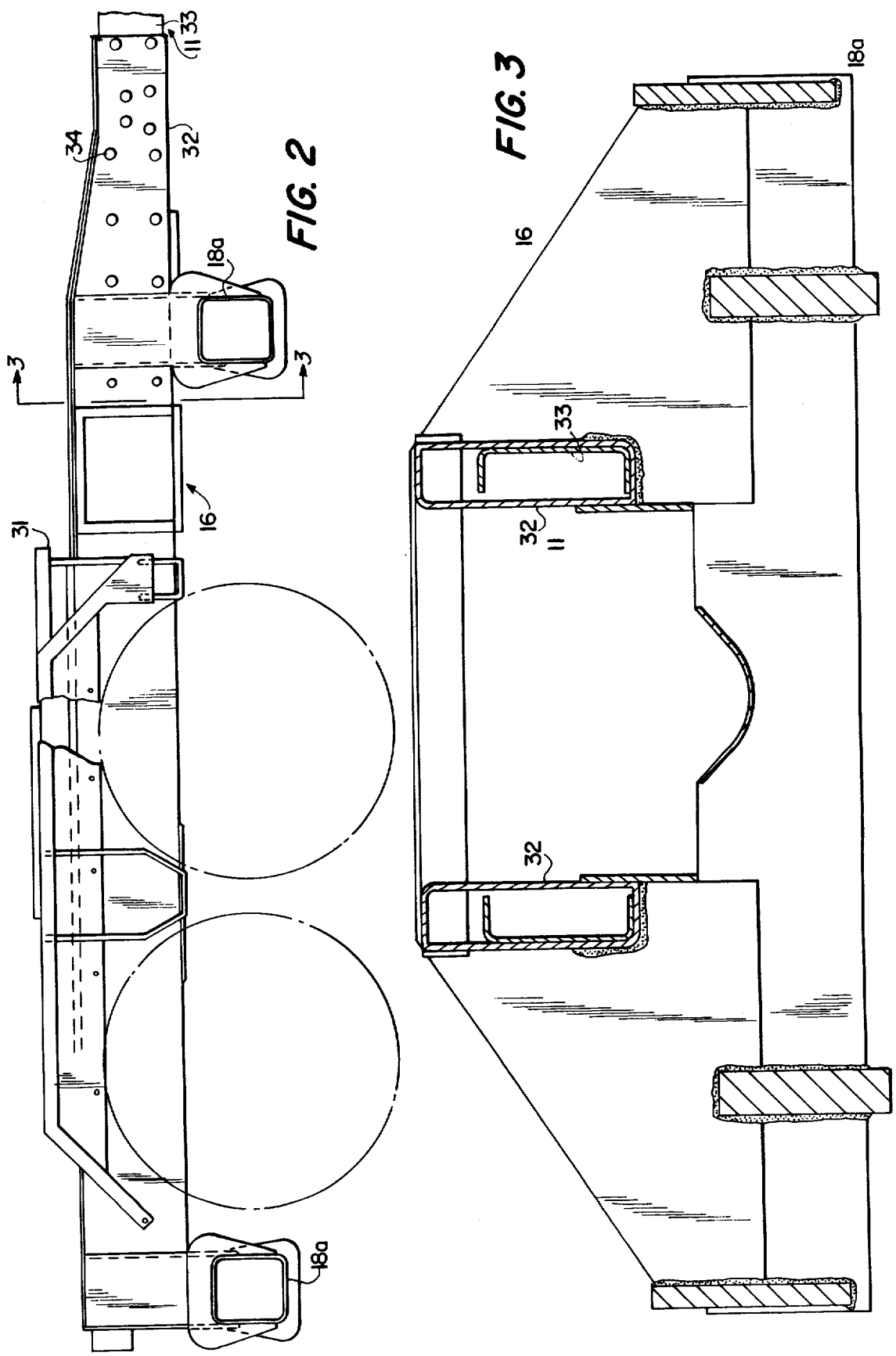

TRUCK MOUNTED CRANE AND METHOD OF CONSTRUCTING SAME

A method of making a truck mounted crane comprising providing a truck front and including an engine, cab, steering wheels, and frame members extending rearwardly a short distance beyond the cab, providing a heavy load bearing rear frame, joining the rear frame to the front longitudinal frame members, and then assembling the rear wheels and crane upper works onto the rear frame.

The present invention relates to truck mounted cranes, to a method of manufacturing a truck mounted crane, and to a crane upper works.

Truck mounted cranes have been used for their maneuverability and versatility. They may be driven at highway speed, from place to place, carrying the crane structure as an integral part thereof. The crane structure, typically mounted rearwardly of the truck cab, includes an upper works which is rotatable, the upper works including a boom support and a boom pivotally connected to it. In some types of truck mounted cranes, the operation of the crane is conducted through the manipulation of controls in a cab which is stationarily positioned on the structure. Such truck mounted cranes are suitable only to the extent that the crane is to be operated generally in the area in front of the stationary cab, with greatly restricted vision for the crane operator should the crane be swung to operate in other locations relative to the stationary cab.

Another type of truck mounted crane has the crane cab mounted in the rotatable upper works, so as to swing with the upper works, In such constructions, the crane operator always generally faces in the direction of the load which is supported by the crane. However, in such constructions, the crane cab is positioned laterally of the crane boom, so that there is great obstruction to the field of view of the crane operator by the crane boom.

An example of the first mentioned type of truck mounted crane is shown in Grove U.S. Pat. No. Des. 214,035, and an example of the latter mentioned type of truck mounted crane is shown in Gorl et al U.S. Pat. No. 3,885,677.

Other known prior art constructions include Boyer U.S. Pat. No. 3,095,978, in which the crane operator's seat is laterally of the center line, and the vision of the crane operator is somewhat obstructed due to forwardly mounted posts which support guide members for the boom, which is intended to move bodily on the guide members. In another construction, White U.S. Pat. No. 2,774,484, a crawler mounted crane was provided, having a single operator's cab, but with the boom mounted in front of the operator's cab, thereby tending to obstruct vision of the operator.

Truck mounted cranes have typically been manufactured by producers of cranes, with purchase of the truck components from a truck manufacturer. Thus, there has been obtained from the truck manufacturer an assemblage including a chassis with front and rear wheels, an engine, with the conventional auxiliary equipment for the engine, and a fully equipped cab with the usual controls therein. The crane manufacturer then constructed a crane mounting frame which was mounted on the chassis of the truck as obtained from the truck manufacturer, the crane chassis comprising structural members which were positioned on the structural frame members of the truck chassis. The crane chassis included, for example, outrigger housings, outrigger beams therein, and a support for a large diameter bearing on which the upper works was rotatably mounted. The upper works was provided, constructed as set forth hereinabove. This method of construction of truck mounted cranes was deficient in that the crane frame and the frame forming the truck chassis had to be joined together, with the crane chassis on top, thereby adding to the height of the overall structure. In addition, it was necessary to join some parts to others in a manner which was more difficult than necessary, such as the joining of the outrigger tubes to the supporting structure therefor.

Another truck mounted crane construction included a crane carrier sub-assembly, specifically constructed for supporting a crane upper works. The crane carrier was not made by the large automobile and truck manufacturers, with their economies of scale, but by crane producers or truck manufacturers to the specification of the crane producer. The crane carrier included a chassis including frame members extending from the front, adjacent the front steering wheels and engine, to the rear, over the rear driving wheels. This chassis at the rear was strong enough to support the crane loads, and included outriggers. A crane upper works including boom support, boom, lift cylinders and crane cab controls was provided on the crane carrier. Because of the small production of crane carriers relative to trucks produced by truck manufacturers, costs of truck mounted cranes including crane carriers were comparatively high.

The present invention is directed to a truck mounted crane, including a truck portion with truck cab, engine and front steering wheels, and a rearwardly extending chassis supported by rear driving wheels and a rotatable crane upper works, mounted on the rear chassis. The crane upper works includes a longitudinally extending platform, having at the front thereof, and centrally mounted, the crane cab, provided with the conventional seat and crane controls. Rearwardly of the crane cab there is provided a boom mount, in the form of a pair of spaced, parallel plates which extend upwardly and thence rearwardly, generally in the shape of an inverted "L". A boom is pivotally connected to the upper part of the boom support, and extends forwardly on the center line of the upper works, thereby extending directly over the crane cab. The rotatable upper works platform is provided with an engine rearwardly of the connection of the boom support to the platform, somewhat underlying the upper portion of the boom support structure. The crane chassis comprises a pair of longitudinally extending tubular members, and the truck chassis has relatively short frame members extending rearwardly of the truck cab, and having the rearward end portions thereof positioned in the tubular frame members of the rear or crane frame. The crane frame, because it is required to react to relatively great loads in comparison to the loads imposed on the front end of the truck mounted crane, is made heavier. Thus, the crane frame or rear frame is at approximately the same level as the truck frame. Rear driving wheel assemblies, known as "bogies" are connected to and support the rear portion of the truck mounted crane during movement as a truck, with outriggers being provided as part of the rear or crane chassis or frame for use where required.

The herein provided method of truck frame manufacture provides for the provision of a truck front end, including engine, front wheels, truck cab and associated controls, and relatively short frame members extending rearwardly of the cab, together with the provision of a rear frame constructed for reacting large forces, and including longitudinal extending tubular members, with the joining of the two frames by the insertion of the frame members of the truck front end into the tubular frame members of the rear chassis and the joining of the members together, as by bolts. The truck mounted crane is completed by the addition of bogies, and the upper works.

Among the objects of the present invention are to provide a mobile crane providing a crane cab positioned so as to provide optimum visability for the crane operator, to provide an improved truck mounted crane chassis construction which is lower than heretofore provided, and which is more economical to construct, and a further object is the provision of an improved method of manufacturing a truck mounted crane.

Other objects and many of the attendant advantages of the present invention subject matter will be readily understood from a consideration of the following specification, drawings and claims.

IN THE DRAWINGS

FIG. 2 is an elevational view of a portion of the rear chassis of the truck mounted crane of FIG. 1, joined to a portion of the front or truck chassis thereof.

FIG. 3 is a cross sectional view taken on the line 3—3 of FIG. 1

Figure 1:
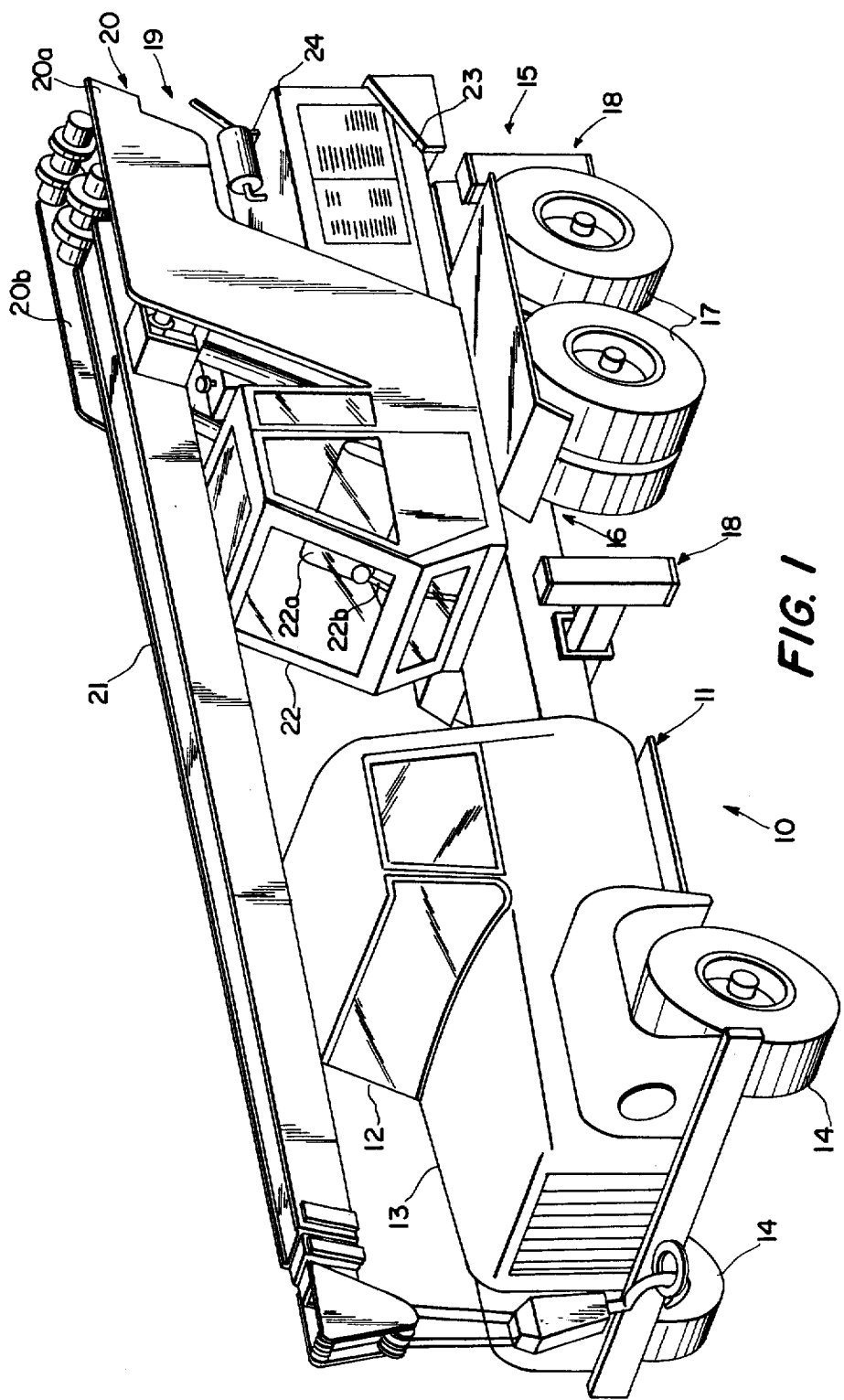
FIG. 1 is a perspective view of a truck mounted crane in accordance with the present invention.

Referring now to the drawings, wherein like or corresponding reference numerals are used to designate like or corresponding parts through the several views, there is shown in FIG. 1 a truck mounted crane generally designated 10. The truck mounted crane includes a front end which is generally designated 11, the truck front end including the cab 12 with an engine compartment 13 in front of it, with an engine (not shown) therein. There are also disclosed the front steering wheels 14. The cab 12 is provided with the conventional controls, such as steering wheel, brakes, throttle control and transmission lever, and the engine compartment 13 is provided with the conventional elements such as battery, generater or alternator, etc. The rear end 15 of the truck mounted crane 10 comprises a relatively heavy load bearing frame, generally designated 16, rear drive wheels 17, in the form of a bogeyassembly, there being outriggers 18 provided as a part of the rear frame 16. Mounted on the rear frame 16 is the rotatable upper works 19, which may be seen to comprise a boom support 20, a boom 21 pivotally mounted on the boom support 20 about a horizontal axis, and a crane cab 22. The boom support 20 will be seen to comprise a pair of spaced plates 20a and 20b, each generally in the shape of an inverted "L", so as to provide a rearwardly extending horizontal portion. The boom 21 is a multi-part extensible boom. The crane cab 22 includes an operator's seat 22a, and conventional crane controls, a lever 22b being illustrated. The crane cab 22 is provided with front and side windows, as well as a lower window, for downward vision; as shown in FIG. 1, the structure of the upper works 10 other than boom 21 is rearwardly of crane cab 22, and since boom 21 is above the crane cab 22, vision of the operator from crane cab 22 forwardly through the front window and laterally through both side windows is unobstructed in all positions of the upper works 10 when the crane is being operated.

As will be observed, the boom support 20 and the crane cab 22 are in alignment, and the boom 21 extends from the boom support and directly over the crane cab 22. Thus, a vertical plane of symmetry of the boom support 20, boom 21 and crane cab 22 will be common to these three elements, so that they may be said to have a common plane of symmetry. Thus, the operator seated in the crane cab is seated substantially on the central plane of the upper works 19.

FIG. 1 is an illustration of the position of the truck mounted crane, including upper works 19 thereof, for transport, and in this position the crane cab 22 faces forwardly with the boom 21 extending directly over the truck cab 12.

The upper works 19 is constructed by providing a longitudinally extending platform 23, and the crane cab 22, boom support 20 and an engine within the engine compartment 24 are provided, in the order named, front to rear, on the platform 23. Thus, the engine in the compartment 24 serves as a counterbalance for the load which will be supported by the boom 21. As will be understood, suitable controls for the engine 24 are located in the crane cab 22, and suitable apparatus for raising and lowering the boom 21 is provided, such as a pump, and one or more lift cylinders.

Referring now to FIG. 2, there may be seen the rear frame 16, with outrigger housings 18a and a super-structure generally designated 31 upon which there will be mounted the bearing for the rotatable upper works. At the right end of FIG. 2, there is shown, broken away, a portion of the truck front end 11.

Referring now to FIG. 3, there is shown the rear frame 16, which includes a pair of longitudinally extending frame members 32 of substantially identical construction, being in the form of generally tubular elements of relatively great depth, thereby sustaining the loads and forces imposed by the lifting of a load by the crane. Within the longitudinally extending tubular frame members 32 are channels 33, which are the longitudinally extending frame members of the truck front end 11. The bottom of the channel 33 rests upon the bottom plate of the tubular frame member 32. The frame members 32 are made up of vertical plates and horizontal plates or portions, since the frame members 32 may be constructed in various ways, including the welding of four plates, or the assemblage of a plate to a channel, etc.

Referring again to FIG. 2, there will be seen bolts 34 serving to join together the frame members 32 and 33. The the frame member 33 of the truck front end 11 is relatively short, extending to a point just to the left of the line 3—3 on FIG. 2. While the length of the longitudinally extending frame members 33 of the truck front end 11 may be varied somewhat as desired, in accordance with engineering and production practices, the front end frame members 33 terminate far short of the rear of the completed chassis, and in fact, as is clearly shown in FIG. 2, terminate in advance of the rear wheels. The overlapping relationship, in the longitudinal direction, of the frame members 32 and 33 is provided so as to permit their connection or joining to each other, although it is possible to construct a chassis in accordance with the present invention without overlapping, but by having an overlapping connecting plate structure. The herein disclosed construction is preferred.

The bottoms of the rear frame members 32 will be seen to be substantially below the top plates of the front frame members 33, thereby providing a relatively lower height of the rear chassis, including the super-structure 31, which serves as a reference plane for height determination purposes.

Figure 4:
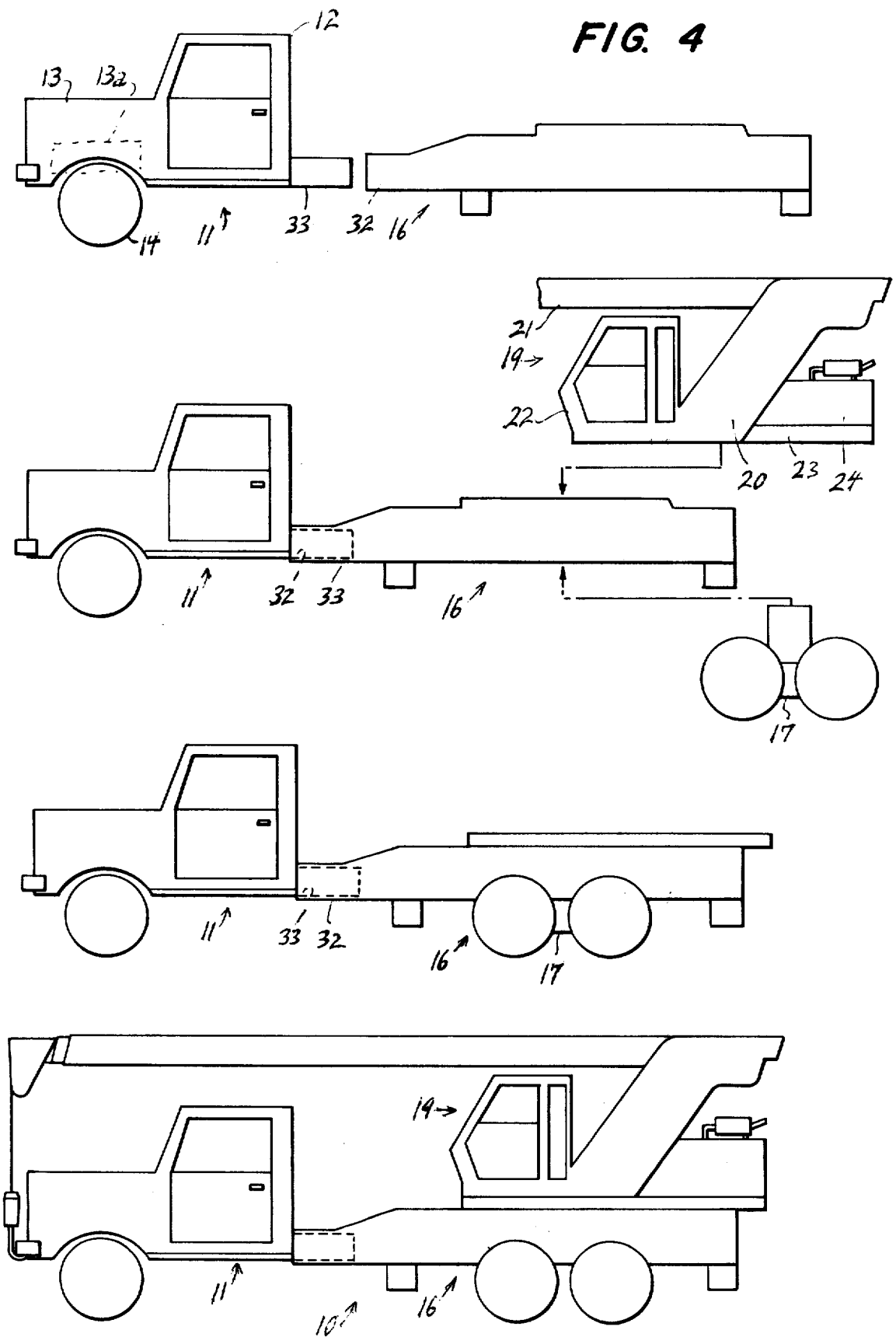
FIG. 4 is a diagrammatic view illustrating the herein disclosed method of manufacture.

Referring now to FIG. 4, there is illustrated the method of producing a truck mounted crane in accordance with the present invention. Thus, there is shown the provision of a truck front end 11, including a cab 12, which is conventionally appointed, an engine compartment 13 with an engine 13a therein, and front steering wheels 14. There may also be seen relatively short frame members 33 extending reardwardly of the cab 12. Adjacent to the front end 11 there is provided a rear end or chassis 16, constructed as disclosed in FIGS. 1–3 hereof. The front end 11 and the rear end 16 are joined by the insertion of the front end longitudinally extending and short frame members 33 into the longitudinally extending frame members 32 of the rear end 16, as illustrated in the second stage of FIG. 4. The rear wheels 17, preferably in the form of a bogey assembly, are provided, and are joined to the rear chassis 16. The rear wheel 17 may be joined to the chassis 16 either before or after the joining of rear chassis or frame 16 to the front end 11. There thereby results the construction as shown in the third stage of FIG. 4. There is also provided an upper works 19, which includes a platform 23, an engine in the compartment 24, forwardly of which is the boom support 20, mounting the boom 21. Forwardly of the boom support 20 is the crane cab 22. As will be understood, the platform 23 may have the engine, boom support, and boom 22 mounted thereon at any time, and in the desired sequence, relative to the mounting of the platform 23 on the chassis 16. The resulting truck mounted crane as shown in the fourth phase of FIG. 4, thus providing completed truck mounted crane 10.

It will be obvious to those skilled in the art that various changes may be made without departing from the spirit of the invention, and therefore the invention is not limited to what is shown in the drawings and described in the sprcification but only as indicated in the appended claims.

I claim:
1. A truck mounted crane comprising:
   a truck front end including a source of energy, front braked steering wheels, a truck cab including a steering wheel, energy source controls and brake controls, and spaced longitudinal frame members extending rearwardly of said truck cab,
   a rear end comprising a heavy load bearing frame including spaced longitudinal frame members, means joining said last mentioned frame members to said front longitudinal frame members at approximately the same level thereof, rear drive wheels, outrigger means carried by said load bearing frame, an upper works mounting structure supported by said load bearing frame, and
   an upper works rotatably supported on said upper works mounting structure and comprising:
      a platform,
      a crane cab located forwardly on said platform, said crane cab comprising crane controls and having front and side windows,
      boom support means of inverted "L" shape rigidly on said platform rearwardly of said crane cab, and comprising upwardly and rearwardly extending parts, the top of said rearwardly extending part of said boom support means being above the top of said crane cab, a boom pivoted on the rearwardly extending part of said boom support means and extending forwardly over said crane cab, and having a horizontal position in which the bottom is in closely spaced relation above the top of the crane cab, and the top of the truck cab,
      said rearwardly extending part of said boom support means being substantially the highest part of said crane when said boom is horizontal,
      said crane cab, boom support means and boom being laterally centered on said upper works,
      crane upper works elements other than said boom and platform being rearwardly of said crane cab,
   whereby to provide unobstructed vision for an operator in said crane cab forwardly and to both sides, and whereby said truck mounted crane has low vertical height for travelling.
2. The truck mounted crane of claim 1, said crane upper works elements other than said boom and platform comprising a source of energy on said platform at the rear thereof.
3. A truck mounted crane comprising:
   a truck front end including a source of energy, front braked steering wheels, a truck cab including a steering wheel, energy source, controls and brake controls,
   rear end means for supporting a rotatable upper works and having a reference plane for height determination relatively low in comparison to a truck mounted crane having a load bearing frame mounted on a truck chassis, said rear end means comprising a heavy load bearing frame, rear drive wheels, outrigger means, and upper works mounting structure supported by said load bearing frame, and
   an upper works rotatably supported on said upper works mounting structure and comprising:
      a platform,
      a crane cab located forwardly on said platform, said crane cab comprising crane controls and having front and side windows,
      boom support means rigidly on said platform rearwardly of said crane cab, the top of said boom support means being above the top of said crane cab,
      a boom pivoted on said boom support means and extending forwardly over said crane cab, and having a horizontal position in which the bottom of the boom is in closely spaced ralation above the top of the crane cab and the top of the truck cab,
      said boom support means being substantially the highest part of said crane when said boom is in a horizontal position,
      lift cylinder means on said platform below said boom for raising said boom,
      said crane cab, boom support means and boom being laterally centered on said upper works,
      crane upper works elements other than said boom and platform being rearwardly of said crane cab,
   whereby to provide unobstructed vision for an operator in said crane cab forwardly and to both sides, and whereby said truck mounted crane has low vertical height for travelling.
4. The truck mounted crane of claim 3, said crane upper works elements other than said boom and platform comprising a source of energy on said platform at the rear thereof.